Jan. 18, 1949.  A. R. SEGAL  2,459,460
CASE FOR CIRCLE SAWS
Filed Sept. 20, 1947
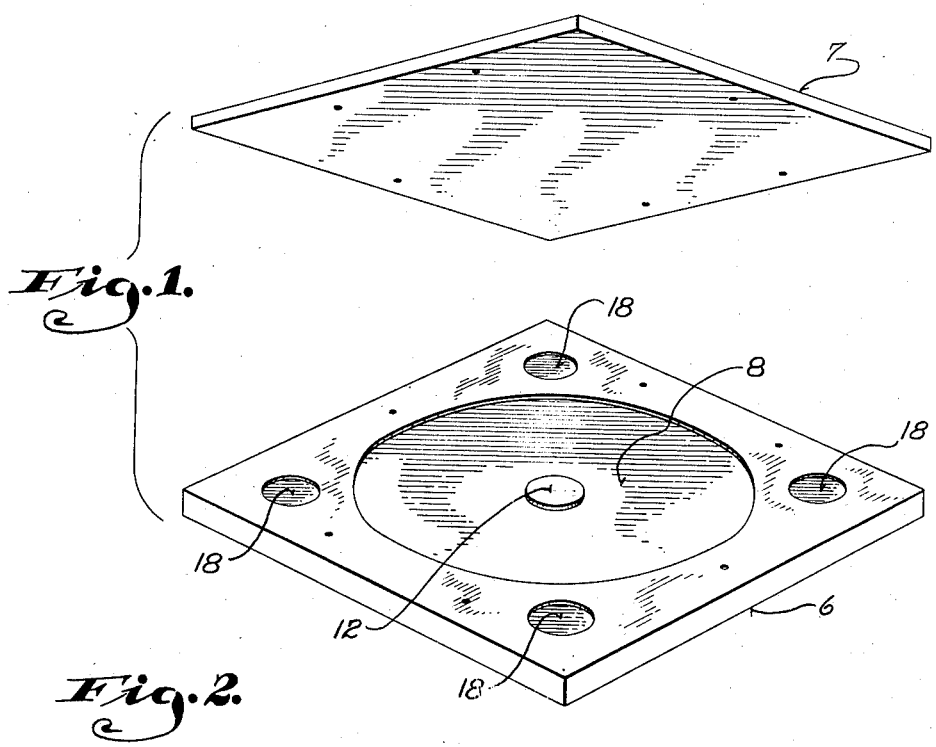
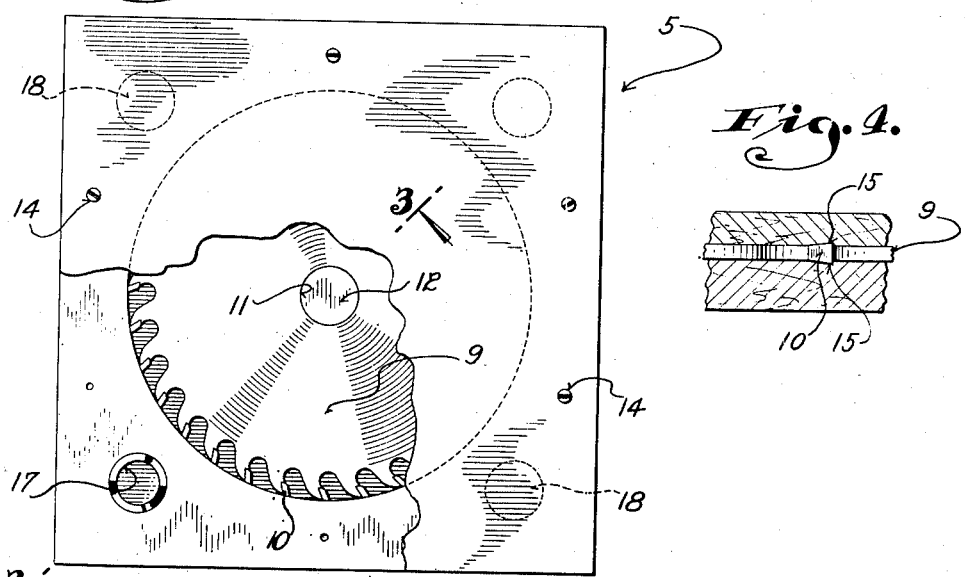
Inventor
Arthur R. Segal
By Ira Milton Jones
Attorney Patented Jan. 18, 1949

2,459,460

UNITED STATES PATENT OFFICE 2,459,460

CASE FOR CIRCLE SAWS

Arthur R. Segal, Milwaukee, Wis.

Application September 20, 1947, Serial No. 775,282

5 Claims. (Cl. 206—46)

This invention relates to cases for circle saws and has more particular reference to protective cases that can be used for the shipping and/or storage of circle saws having carbide tipped teeth.

Circle saws having carbide tipped teeth are coming into widespread use by reason of their fast cutting action and their ability to remain in every day use for relatively long periods of time before sharpening of the tips is necessary. Despite the wear resisting qualities of the carbide used on the tips of the teeth on such circle saws, the carbide itself is relatively brittle and delicate, and extreme care must be exercised in handling such saws to guard against sudden shocks or shearing stresses which might lead to breakage of the tips.

Because of this fact, the shipment of carbide tipped saws from their point of manufacture to their place of use has always presented the problem of adequately protecting the carbide tips against breakage from the rough handling the saws receive.

The seriousness of breakage or damage resulting to the saws is best appreciated when it is realized that carbide tipped saws frequently cost hundreds of dollars each. It will be apparent, therefore, that the best obtainable protection for the saw must be provided for shipment thereof. Protection for saws of the type herein concerned presently consists in confining the saw between two sheets of Masonite held clamped to opposite sides of the saw by a single bolt passing through the central aperture of the saw, wrapping cardboard or corrugated board around the Masonite and finally covering the package with wrapping paper, usually of a heavy grade.

Even though carbide tipped saws wrapped in this manner have been carefully packaged, the packages have frequently failed to perform their primary function of protecting the saw. Hence, the inadequacy of present wrappings fail to lend justification to the high cost of the packaging material required and the inconvenience involved in actual packaging. Moreover, the excessive weight of the packaging material used results in excessive shipping costs.

With these objections to present saw packages in mind, it is an object of this invention to provide an improved case for carbide tipped circle saws which will afford adequate protection for the saw during shipping.

Another object of this invention resides in the provision of an improved protective case for carbide tipped circle saws which may be used by the purchaser of the saw for storage when the saw is not in use and which may be used time after time for shipment of the saw to its manufacturer for regrinding by factory methods.

Still another object of this invention resides in the provision of an improved case for carbide tipped circle saws which features simplicity of construction and ease of packaging, yet assures adequate protection for the saw packaged therein.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a perspective view of the saw case of this invention showing the cover removed and positioned above the body of the case;

Figure 2 is a plan view of the case in its operative condition with portions of the cover broken away to show the saw in the case;

Figure 3 is an enlarged sectional view taken along the lines 3—3 of Figure 2; and Figure 4 is an enlarged cross sectional view taken through Figure 3 on the plane of the line 4—4.

Referring more particularly to the accompanying drawing in which like numerals indicate like parts, the numeral 5 generally designates the saw case of this invention. As shown best in Figure 1, the case comprises a flat body section 6 and a flat cover section 7 adapted to receive a saw flatwise therebetween. The sections are substantially square in outline and are preferably made of plywood, although other low cost materials of equivalent strength may also be employed.

The body section 6 has slightly greater thickness than the cover section 7, and has its flat upper face provided with a circular well 8 of a diameter to receive a saw 9 flatwise therein as shown in Figure 2. Inasmuch as it is usual practice to provide circle saws of the type herein concerned with a central aperture 11, the diameter of which remains the same regardless of the outer or cutting diameter of the saw, the lower or body section of the case is preferably provided with a boss 12 projecting up from the bottom of the well 8 centrally thereof to engage in the central aperture of the saw placed in the well. The boss thus aids in minimizing edgewise shifting of the saw in the well.

A circle saw placed in the well 8 of the body section is securely maintained in place against shifting either edgewise or axially at the time the cover section 7 is placed over the saw and fastened to the body section as indicated in Figures 2 and 3. In the embodiment shown, screws 14 passing through suitable apertures in the cover section thread into the body section to tightly draw the cover down onto the upper face of the body section and thus clamp the saw in the well 8 between the bottom of the well and the underside of the cover section.

One of the features of the saw case of this invention resides in the fact that the depth of the well, while substantially corresponding to the thickness of the saw at the body portion thereof, has less depth than the edge-to-edge dimension of the carbide tips 10 on the saw measured across their cutting faces. For clearance purposes the sides of the tips invariably taper inwardly toward the joint between the tips and the saw teeth behind the tips so that the dimension across the cutting face of the tips is always greatest. By reason of this fact the front side edges 15 of the tips are caused to bite into the bottom of the well and the underside of the cover section when the latter is firmly secured in place by the screws 14 to positively preclude any tendency for the saw to shift in an edgewise or axial direction in the well. This condition is shown in exaggerated form in Figure 4.

When the depth of the well 8 is not less than the body thickness of the circle saw packaged in the case the cover section 7 and the body section 6 meet with a flat surface-to-surface engagement to provide a compact case of great strength.

As stated previously, circle saws of the type herein concerned have central apertures of only one diameter, that is, an aperture large enough to fit the largest shaft upon which the saw is to be mounted. Hence, it is customary to provide carbide tipped circle saws with one or more bushings indicated at 17 in Figures 2 and 3 to enable mounting the saw on shafts having smaller diameters. According to the present invention, provision is made for shipment of such bushings in the case of this invention through the formation of corner wells 18 at the four corners of the body section and surrounding the central well 8. These corner wells have a diameter corresponding roughly to the diameter of the central aperture of the saw and a depth approximately equal to the axial length of the bushings. While the bushings may have a length corresponding to the body thickness of the saw, they usually have slightly less length than the body thickness of the saw. Hence, as many as four bushings, to adapt the saw for use with shafts of four different diameters, may be shipped or stored in the case of this invention along with the saw.

From the foregoing description taken in connection with the accompanying drawings, it will be readily apparent to those skilled in the art that the saw case of this invention provides a high degree of protection for circle saws having carbide tipped teeth by reason of the manner in which the tips on the teeth are engaged by the sections of the case; and that the case is useful time and again whenever it becomes necessary to return the saw to the manufacturer for grinding of the carbide tips on its teeth as well as for the storage of the saw when not in use. Another important advantage of the saw case of this invention resides in its simplicity and in the ease with which saws may be packaged therein.

What I claim as my invention is:

1. A protective case for a circle saw comprising: a substantially flat body section having a circular well formed in one face of a depth and diameter to receive a saw to be packaged in the case; a cover flatwise applicable to said face of the body section to close said well; and securing means for detachably holding the cover section tightly down onto said face of the body section and the exposed side of a saw in the well thereof so as to completely enclose the saw.

2. The saw case set forth in claim 1 further characterized by the provision of a circular boss projecting up from the center of said well and of a size to substantially fit the hole in the saw to be packaged.

3. A protective case for a circle saw having teeth provided with carbide tips wider at their cutting faces than the thickness of the saw, comprising: a substantially flat body section having a circular well formed in one face of a diameter to receive the saw and of a depth substantially equal to the thickness of the body of the saw and consequently less than the edge-to-edge dimension of the carbide tips measured across the face of the tips; a cover flatwise applicable to said face of the body section to close said well; and securing means for drawing the cover tightly down toward said face of the body section so as to cause the edges of the carbide tips to bite into the underside of the cover and the bottom of the well and thereby preclude shifting of the saw in the case.

4. The saw case set forth in claim 3 further characterized by the provision of a smaller circular well in said face of the body section adjacent to the first designated well and providing for the reception of a bushing for the saw, said bushing being adapted to be retained in its well by the cover of the case.

5. A protective case for a circle saw comprising: a relatively flat body section; a relatively flat cover section; and securing means for tightly holding said sections flatwise together; said body section having a well therein of a depth substantially corresponding to the body thickness of the saw to be packaged in the case so that the side edges of the cutting teeth of the saw bite into the bottom of the well and the underside of the cover to thereby cause the saw to be retained in place in said well against shifting during handling of the package.

ARTHUR R. SEGAL.

No references cited.